United States Patent
Parker et al.

(10) Patent No.: US 6,769,650 B2
(45) Date of Patent: Aug. 3, 2004

(54) PARACHUTES

(75) Inventors: Nigel Stuart Parker, Llantwit Major (GB); David Richard Jordan Hirst, Bridgend (GB)

(73) Assignee: Wardle Storeys (Safety & Survival Equipment) Limited, Barnoldswick (GB)

( * ) Notice: Subject to any disclaimer, the term of this patent is extended or adjusted under 35 U.S.C. 154(b) by 0 days.

(21) Appl. No.: 10/406,005

(22) Filed: Apr. 3, 2003

(65) Prior Publication Data

US 2004/0065782 A1 Apr. 8, 2004

Related U.S. Application Data

(63) Continuation of application No. 10/013,834, filed on Dec. 13, 2001, now abandoned.

(30) Foreign Application Priority Data

Dec. 13, 2000 (GB) .............................................. 0030396

(51) Int. Cl.⁷ .............................................. B64D 17/02
(52) U.S. Cl. ...................... 244/152; 244/142; 244/145; 244/149
(58) Field of Search ................................ 244/142, 145, 244/149, 152

(56) References Cited

U.S. PATENT DOCUMENTS

| | | | | |
|---|---|---|---|---|
| 1,872,705 A | * | 8/1932 | Elliott | 244/145 |
| 2,523,276 A | * | 9/1950 | Buhler | 244/142 |
| 3,110,459 A | * | 11/1963 | Heinrich | 244/149 |
| 3,385,539 A | * | 5/1968 | Ewing et al. | 244/142 |
| 3,420,478 A | * | 1/1969 | Ferguson | 244/142 |
| 3,586,269 A | * | 6/1971 | Hensley | 244/152 |
| 4,586,685 A | * | 5/1986 | Kostelezky | 244/145 |
| 4,955,563 A | * | 9/1990 | Lee et al. | 244/152 |
| 5,248,117 A | * | 9/1993 | Hennings | 244/142 |
| 5,388,787 A | * | 2/1995 | Webb et al. | 244/142 |
| 6,003,815 A | * | 12/1999 | Parker et al. | 244/142 |
| 6,276,638 B1 | * | 8/2001 | Parker et al. | 244/142 |

FOREIGN PATENT DOCUMENTS

| | | |
|---|---|---|
| EP | 0 861 783 | 9/1998 |
| GB | 266345 | 7/1927 |
| GB | 552895 | 4/1943 |
| GB | 776296 | 6/1957 |
| GB | 2 102 357 | 2/1983 |
| GB | 2 220 626 | 1/1990 |
| WO | 99/61315 | 12/1999 |

* cited by examiner

Primary Examiner—Michael J. Carone
Assistant Examiner—L. Semunegus
(74) Attorney, Agent, or Firm—Jacobson Holman PLLC

(57) ABSTRACT

A parachute has a canopy and rigging lines with skirt assist lines connected between a point on each rigging line adjacent a lower edge of the canopy and a point on the interior of the canopy spaced from the lower edge. The arrangement is such that a portion of the canopy between the point and the lower edge is relieved of tension as the canopy is deployed to assist the opening of the canopy. The skirt assist lines are frangible. This prevents rapid deployment of the canopy to lower g-forces on the load in high speed opening.

10 Claims, 1 Drawing Sheet

PARACHUTES

This application is a continuation of Ser. No. 10/013,834 filed Dec. 13, 2001 now abandoned.

BACKGROUND TO THE INVENTION

1. Field of the Invention

The invention relates to parachutes.

2. Brief Review of the Prior Art

The term "parachutes" is intended to cover any type of parachute provided with a canopy with rigging lines connecting the canopy to a load. When such a parachute is deployed, air enters the canopy of the parachute and inflates the canopy. When the canopy is deployed at low speeds and at low levels, the inflation may not be sufficiently rapid to ensure satisfactory opening. In order to improve the opening, it is known to provide a plurality of skirt assist lines. Each skirt assist line extends between a respective rigging line and a respective point on the interior of the canopy such that a portion of the canopy between the point and the lower edge of the canopy is relieved of tension as the canopy is deployed. As a result, this portion of the canopy spreads very rapidly and assists in rapid opening of the remainder of the canopy.

It is a problem with such skirt assist lines that, at higher speeds, the rapid deployment of the portion of the canopy between the connection points of the skirt assist lines and the lower edge of the canopy can induce g-forces on a load which are undesirable. The load may be a parachutist or cargo. This is particularly true where the load is a person and can occur, for example, where the parachute forms part of an ejection seat which may be deployed at high or low levels and at high or low speeds.

SUMMARY OF THE INVENTION

According to the invention, there is provided a parachute comprising a canopy having a lower edge, rigging lines connecting the canopy to a load, and a plurality of skirt assist lines, each skirt assist line extending between a respective rigging line and a respective point on the interior of the canopy such that a portion of the canopy between the point and the lower edge is relieved of tension as the canopy is deployed to assist the opening of the canopy, the skirt assist lines being frangible.

By making the skirt assist lines frangible, the skirt assist lines can be rendered inoperative in circumstances where their operation would cause undesirable g-forces.

The following is a more detailed description of an embodiment of the invention, by way of example, reference being made to the accompanying drawings in which:—

DESCRIPTION OF THE PREFERRED EMBODIMENTS

Figure 2:
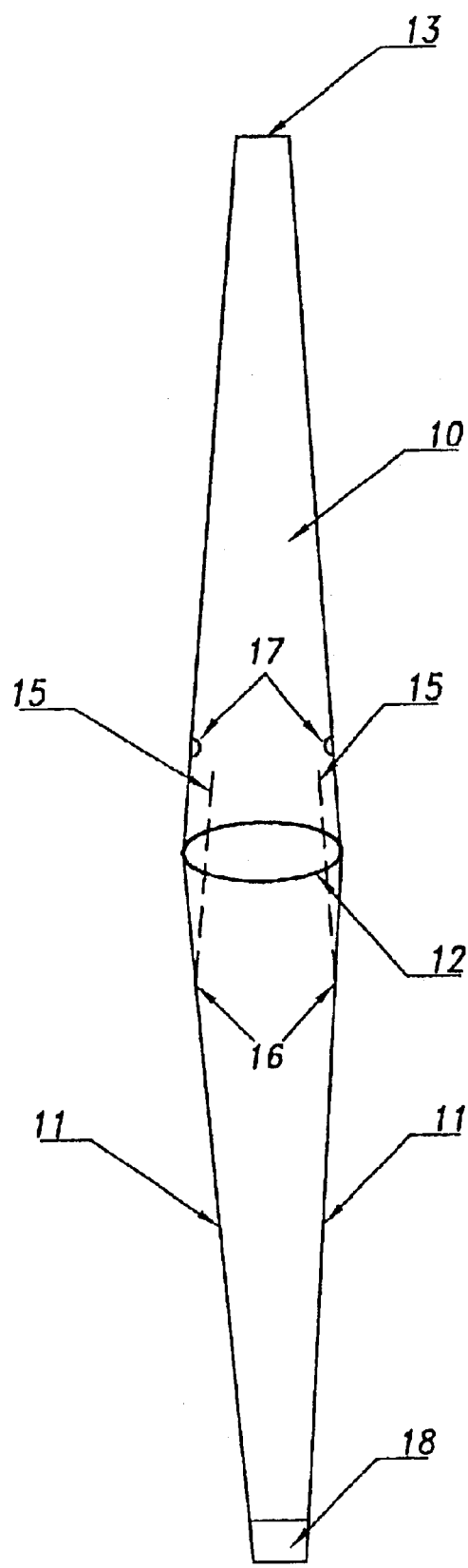
FIG. 2 is a similar view to FIG. 1 but showing the skirt assist lines broken.
Figure 1:
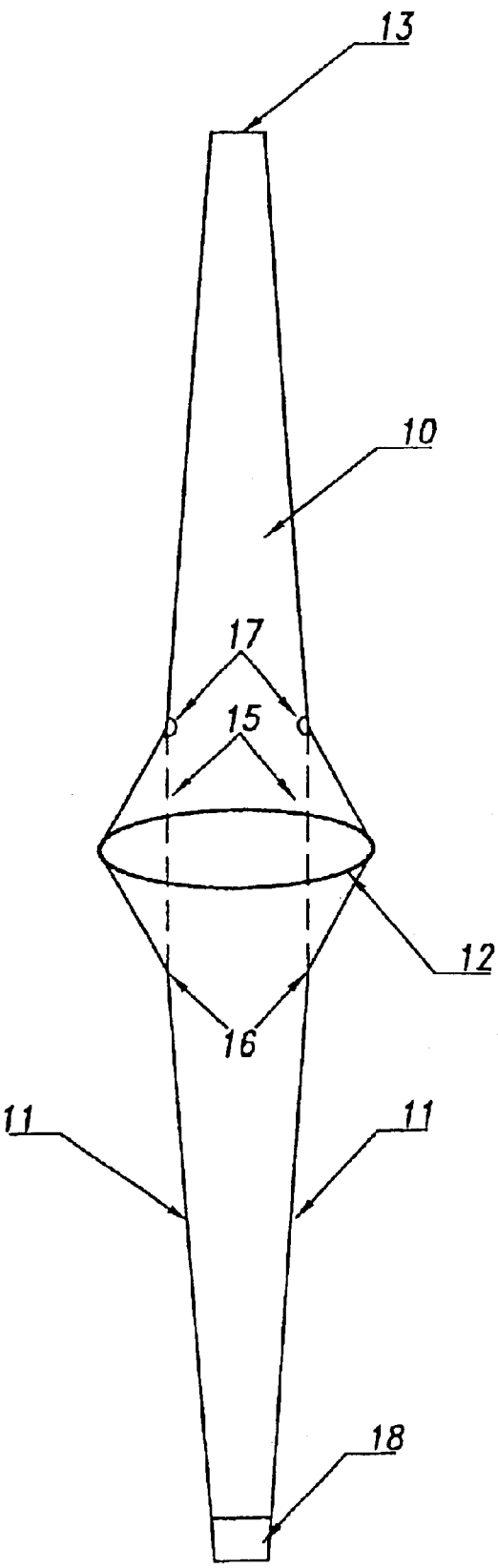
FIG. 1 is a schematic view of a parachute showing a canopy of the parachute in a first stage of deployment and rigging lines for connection to a load with skirt assist lines extending between the rigging lines and the canopy.

Referring first to FIG. 1, the parachute comprises a canopy indicated diagrammatically at 10 by rigging lines, some of which are shown at 11, attached to a parachutist or cargo shown schematically at 18. The canopy 10 has a lower edge 12 and an apex 13 and may be of any suitable construction. In general, the canopy will be formed by gores (not shown) interconnected by seams.

The canopy 10 may be of any known shape and be for any intended purpose. For example, the canopy may be generally conical and may be deployed by static line or used in free fall. The canopy may be provided as part of an aircraft ejection seat.

The parachute is provided with skirt assist lines 15. Each skirt assist line 15 is connected between a rigging line 11 and the canopy 10. The connection is between a point 16 on the rigging line 11 adjacent the lower edge 12 of the canopy and a point 17 on the interior of the canopy 10 spaced from the lower edge 12. The length of each skirt assist line 15 is less than the distance between the points 16, 17 along the associated rigging line 11 and along the canopy 10. In general, the connection point 17 on the canopy will be along a main seam between two adjacent gores of the canopy 10. There may be a skirt assist line 15 between every rigging line 11 and the canopy 10 or only between some rigging lines 11 and the canopy.

In use, the canopy 10 and the rigging lines 11 are packed in a deployment bag or container (not shown) from which the canopy 10 is deployed. As indicated above, this deployment may be manual or automatic. On deployment, the canopy 10 streams from the deployment bag or container and adopts the uninflated disposition shown in FIG. 1. The effect of the skirt assist lines 15 is to relieve from tension the portion of the canopy 10 between the lower edge 12 and the points 17 of connection of the skirt assist lines 15 on the canopy 10. This allows this portion of the canopy 10 to move outwardly rapidly in the air flow to promote fast inflation of the canopy. This is particularly advantageous when deployment is at low level and/or low speed.

The skirt assist lines 15 are frangible. The purpose of this is to prevent the portion of the canopy 10 between the lower edge 12 and the points 17 of connection of the skirt assist lines 15 on the canopy 10 from moving outwardly on deployment of the canopy 10. This is desirable when the canopy 10 is deployed at high speeds in order to prevent the parachutist or other load 18, being subjected to undesirably high g-forces. Under such circumstances, the higher speed of deployment is sufficient to ensure satisfactory inflation of the canopy 10.

The skirt assist lines 15 may be made frangible and or severable in a number of ways and at any point.

First, each skirt assist line 15 may be provided with a weak point designed to break under a predetermined load equivalent to that experienced by the rigging line 11 when the canopy 10 opens at high speed. Accordingly, on such high speed opening of the canopy 10, the skirt assist lines 15 break at the weak points to prevent rapid outward opening of the portion of the canopy 10 between the lower edge 12 and the points 17 of connection of the skirt assist lines 15 on the canopy 10. The g-forces on the load are thus reduced.

As an alternative to weak points, each skirt assist line 15 may be provided with a device that severs the skirt assist line 15 when high speed opening loads are sensed. This achieves the same effect as the weak points.

Additionally or alternatively, the skirt assist lines 15 may be able to be broken prior to deployment of the canopy 10. For example, the skirt assist lines 15 may be severable at any time before deployment.

We claim:

1. A parachute comprising a single canopy having a lower edge, rigging lines connecting the canopy to a load and a plurality of skirt assist lines, each skirt assist line extending between a respective rigging line and a respective point on an interior of the canopy such that a portion of the canopy between the point and the lower edge is relieved of tension as the canopy is deployed to assist the opening of the canopy, the skirt assist lines being frangible such that, upon breaking of said skirt assist line, said canopy portion is prevented from moving outwardly on deployment, thereby slowing an initial rate of canopy inflation.

2. The parachute according to claim 1 wherein the skirt assist lines are broken prior to deployment of the canopy to prevent rapid outward opening of said portion of the canopy between the point and the lower edge.

3. The parachute according to claim 1 wherein the skirt assist lines are broken during deployment of the canopy only if the load in the skirt assist lines exceeds a predetermined maximum and otherwise remain unbroken throughout canopy deployment.

4. The parachute according to claim 1 wherein each skirt assist line includes a weak point designed to break the associated skirt assist line if the load in the skirt assist line exceeds a predetermined maximum.

5. The parachute according to claim 2 wherein each skirt assist line is severed.

6. The parachute according to claim 3 wherein means are associated with each skirt assist line for severing the skirt assist line when high speed opening loads are sensed.

7. A parachute comprising a canopy having a lower edge, rigging lines connected to the canopy at first points along said lower edge to support a load, and a plurality of skirt assist lines each extending between a second point on a respective rigging line spaced from its lower edge first point and a respective third point on an interior of the canopy spaced from said lower edge first point such that a portion of the canopy between said third point and the lower edge is relieved of tension as the canopy is deployed to assist opening of the canopy lower edge, said skirt assist lines being frangible such that, upon breaking of said skirt assist lines, said canopy portion is prevented from moving outwardly on deployment, thereby slowing an initial rate of canopy inflation preventing the load from being subjected to undesirably high g-forces.

8. The parachute according to claim 7 wherein the skirt assist lines are broken prior to deployment of the canopy to prevent rapid outward opening of said portion of the canopy between the third point and the lower edge.

9. The parachute according to claim 7 wherein the skirt assist lines are broken during deployment of the canopy if the load in the skirt assist lines exceeds a predetermined maximum.

10. The parachute according to claim 7 wherein the skirt assist lines are broken during deployment of the canopy only it the load in the skirt assist lines exceeds a predetermined maximum and otherwise remain unbroken throughout canopy deployment.

* * * * *